United States Patent [19]

Adelman et al.

[11] 4,003,052
[45] Jan. 11, 1977

[54] DIGITAL PREFILTER FOR CLUTTER ATTENUATION IN MTI RADARS

[75] Inventors: Stephen Adelman, Wilton; Marshall Greenspan, Fairfield, both of Conn.

[73] Assignee: United Technologies Corporation, Hartford, Conn.

[22] Filed: Dec. 15, 1975

[21] Appl. No.: 641,127

[52] U.S. Cl. .................................. 343/7.7; 343/5 VQ
[51] Int. Cl.² .......................................... G01S 9/42
[58] Field of Search ...................... 343/7.7, 5 VQ

[56] References Cited
UNITED STATES PATENTS

| | | | |
|---|---|---|---|
| 3,781,882 | 12/1973 | Holberg | 343/7.7 X |
| 3,852,742 | 12/1974 | Fletcher, Jr. et al. | 343/7.7 |
| 3,882,498 | 5/1975 | McGuffin | 343/7.7 X |
| 3,914,763 | 10/1975 | Green et al. | 343/7.7 |

*Primary Examiner*—Malcolm F. Hubler
*Attorney, Agent, or Firm*—Dominic J. Chiantera

[57] ABSTRACT

In a digital moving target indicator (MTI) employing digital filters for rejecting low frequency clutter signals having magnitudes which are 20 to 60 db greater than the moving target return signal, the dynamic range and resolution accuracy requirement of an analog-to-digital (A/D) converter, used to convert the return radar analog video signal to a plurality of digital signal equivalents for presentation to the digital filters, is reduced from that normally required by prefiltering the return video signal through a prefilter network. The digital prefilter utilizes: a low resolution accuracy (low order bit capacity) analog-to-digital (A/D) converter to convert the return analog video signal (comprising both low frequency clutter and high frequency moving target component signals) to a digital signal, a low-pass digital filter to pass only the low frequency clutter signal, a digital-to-analog converter to reconvert the digital clutter signal to an analog clutter signal which is substantially equivalent to the clutter component signal value of the analog video signal, and a summing circuit which provides an analog sum signal representative of the amplitude difference between the analog clutter signal and the return analog video signal, to provide a video signal with a greatly enhanced moving target to clutter signal ratio. The sum signal is presented to the system A/D converter, permitting the use of a low resolution system A/D converter having a substantially reduced dynamic range and lower cost, the system A/D converter providing the digital equivalent signal of the enhanced return video for further processing in the digital MTI filters.

9 Claims, 3 Drawing Figures

DIGITAL PREFILTER FOR CLUTTER ATTENUATION IN MTI RADARS

BACKGROUND OF THE INVENTION

1. Field of Invention

This invention relates to radar systems having digital moving target indicators, and more particularly to prefiltering of the return radar analog video signal prior to presentation to the MTI digital filters.

2. Description of the Prior Art

The use of moving target indicator (MTI) radars to detect moving targets within a scanned sector by detecting the change in amplitude, or phase of the Doppler signal frequency of such targets, is well known in the art. In such systems the reflected radar energy is received from targets in the sector and processed to provide an analog video signal having component Doppler frequencies dependent upon the nature of the target. These signal components are described generally as consisting of small amplitude, high frequency signals from moving targets, and large amplitude, low frequency signals from relatively stationary targets. The MTI radar systems are capable of discriminating between small, varying amplitude signals (denoting moving targets) and relatively fixed amplitude return signals indicative of stationary targets, and generally referred to as clutter. The clutter component signal represents the major portion of the return radar analog video signal, such that moving target signals are masked by a clutter component signal which may be in the order of 20 to 60 db greater. The effectiveness of the MTI system depends upon its ability to filter out the unwanted clutter portion of a return signal so that moving target signals of the lowest order may be detected.

A number of clutter filtering techniques are known in the art. These include delay line cancellers which delay the return video signals of each main bang pulse by one pulse repetition period (PRP) and cancel the fixed amplitude components of a subsequent PRP return to provide moving target indication. Other systems, commonly known as range-gated moving target indicators (RG-MTI), quantize the return signal portion of the PRP into range intervals or bins, providing Doppler, or band pass filters within each range bin to filter out the lower frequency clutter component and pass only the higher frequency moving target components. In the past, the delay line cancellers, or range-gated band pass filters have been of the analog type consisting of passive impedences (such as capacitors, resistors and inductors, whether alone or distributed), and active networks including amplifiers. However, such devices usually have broad, rather than sharp, roll off characteristics, and inherently are extremely difficult and costly to make adaptable. Some of the more recent MTI radar systems employ digital filters, which are implemented with digital signal handling techniques and the use of Z transform equations. Such digital filters can produce very sharp roll off characteristics and are easily modified to vary the attenuation response, however, they are expensive and complex. One of the single most expensive components in a digital filter MTI system is that of the analog-to-digital (A/D) converter which converts the return radar analog vide signal into a digital signal equivalent for presentation to the digital MTI filter and detection circuitry (generally of the range-gated band pass type). Due to the extremely low moving target-to-clutter signal ratios (typically minus 20 to minus 60 db) the dynamic range, or total bit capacity of the A/D converters must be high to insure a converter resolution accuracy which is capable of providing amplitude discrimination between the moving target signal component and the clutter component, to preserve the target signal component in the digital word. These A/D converters, which typically comprise twelve bits, or more, are one of the single most expensive components in the system. Therefore, the cost and the ability to provide a sufficiently high dynamic range A/D converter, present the chief problem and performance limitation of the present state of the art MTI systems employing digital filters.

SUMMARY OF THE INVENTION

An object of the present invention is to provide a reduced cost digital moving target indicator (MTI) radar system with an improved target-to-clutter signal ratio. Another object of the present invention is to provide a low cost clutter filter circuit for use in existing digital MTI radar systems.

According to the present invention, a digital MTI radar includes a timing signal oscillator, a signal source for providing pulsed radar energy for illuminating a spatial sector at a pulse repetition period controlled by the timing signal, and for receiving, during a non-pulse portion of the pulse repetition period, reflected energy from sector targets to provide an analog video signal having a high frequency target signal component representative of moving targets and a low frequency clutter signal component representative of relatively stationary targets and characterized by a given target-to-clutter signal ratio, prefilter circuitry for reducing the low frequency clutter signal component to provide a filtered analog video signal with a target-to-clutter signal ratio which is substantially greater than that of the signal source video signal, a first analog-to-digital (A/D) converter for providing a plurality of digital video signals representative of the filtered analog video signal amplitude coincident in a plurality of successive time intervals provided by quantization of the pulse repetition period by the timing signal, the analog-to-digital converter having a resolution accuracy for providing amplitude discrimination between the target signal component and the reduced clutter signal component, the resolution accuracy being substantially less than that required to provide equal accuracy amplitude discrimination of the target signal component of the signal source video signal, the MTI radar system further including filter and detection circuitry for detecting the high frequency target signal component of the digital video signal and for providing in response thereto, a signal manifestation representative of a moving target.

In further accordance with the present invention, the prefilter circuitry includes a second A/D converter for providing a plurality of digital video signals representative of the analog video signal amplitude coincident in each of the plurality of successive time intervals of the pulse repetition period, the converter having a resolution accuracy which is less than that required to provide accurate amplitude discrimination between the target signal and clutter signal components of the analog video signal, a digital low-pass frequency filter circuit for attenuating the high frequency target signal component of the digital video signals to provide a plurality of filtered digital signals representative of the low frequency clutter component amplitude of the analog video signal, a digital-to-analog converter for providing an analog signal equivalent of the plurality of filtered digital signals which is representative of a substantial portion of the clutter component amplitude of the signal source analog video signal, and summing circuitry for providing to the first analog-to-digital converter a sum signal representative of the difference amplitude between the analog signal equivalent and the signal source analog video signal.

In still further accord with the present invention, the digital low-pass filter circuit includes a first multiplier circuit for providing in response to the plurality of digital video signals, a plurality of filter input signals representative of the product of the digital video signals and a scaling constant less than unity, a full adder circuit for adding the input digital signals presented at one input of the adder to a plurality of feedback digital signals presented at another input of the adder to provide a plurality of sum digital signals, the addition occurring for input and feedback signals coincident in a same time interval, each sum digital signal including a plurality of digital bits provided on a plurality of digital bit lines to the digital-to-analog circuit, a plurality of serial shift registers, each connected to a different one of the digital bit lines, each register providing, in response to successive time intervals, sequential shifting and storage of the plurality of successive digital bits corresponding to the plurality of digital sum signals, the plurality of shift registers, in combination, storing the plurality of sum signals in each pulse repetition period and presenting the digital sum signals, one during each time interval, on a plurality of signal lines after a delay of one pulse repetition period and a second multiplier circuit for providing a plurality of feedback signals representative of the product of each of the delayed sum digital signals from the shift register outputs and a second scaling constant whose value is equal to the difference between the first constant value and unity, and for presenting the plurality of feedback signals to the other input of the full adder circuit.

The prefilter circuitry of the present invention, is adaptable to existing MTI systems, and by providing a substantial enhancement of the target-to-clutter signal ratio of the analog video signal from the signal source, permits a reduction in resolution accuracy of the existing system A/D converter. The component cost of the prefilter circuit including the added low resolution A/D converter, being significantly less than that of a high resolution (high bit capacity) A/D converter required by existing digital MTI systems to provide equal amplitude discrimination of the target signal in the high clutter background. Similarly, for systems requiring a higher degree of moving target detection accuracy, a design flexibility is provided in allowing an increase in resolution accuracy of the prefilter A/D converter, and/or the system A/D converter, to permit higher detection accuracy at a cost which is equal to, or less than, existing system cost. Other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
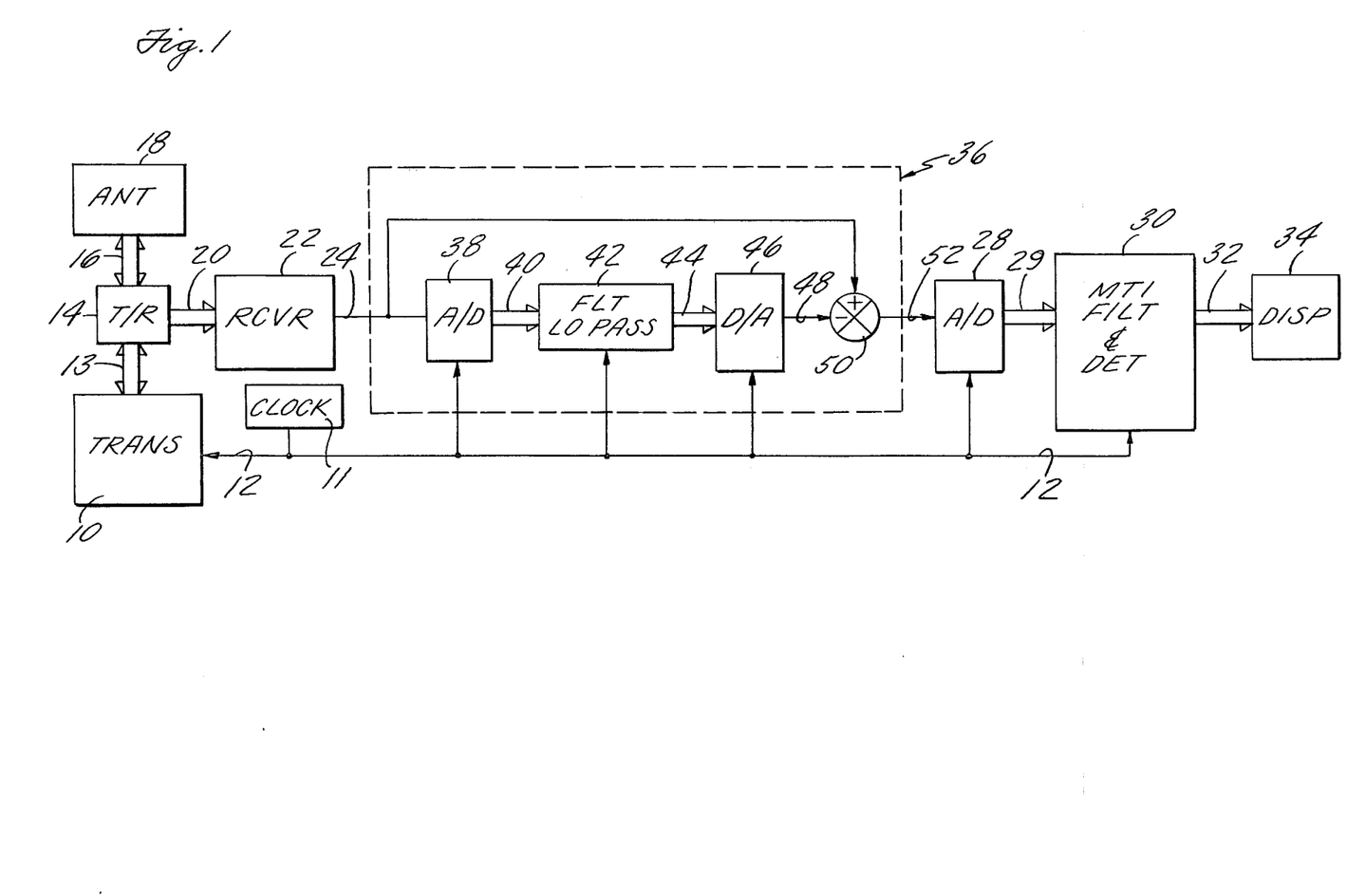
FIG. 1 is a system block diagram of an embodiment of the present invention.

Referring now to FIG. 1, in an exemplary embodiment of a moving target indicator (MTI) radar system according to the present invention, a transmitter 10 provides radar main bang pulses with a pulse repetition period (PRP) dependent on a timing signal from a clock 11, which is provided through a line 12 to the transmitter. The pulses are presented through a wave guide 13, a transmit/receive (T/R) switch 14, and a wave guide 16 to an antenna 18 for propagation into a spatial sector. Reflected radar energy from targets in the scanned sector is received by the antenna 18 and conducted through the wave guide 16, T/R switch 14, and a wave guide 20 to a receiver 22. The transmitter 10 and receiver 22 may be operated in either the coherent or non-coherent mode, and the Doppler frequency signal components of the return radar are provided as an analog video signal at the output of the receiver 22 on a line 24.

Figure 3:
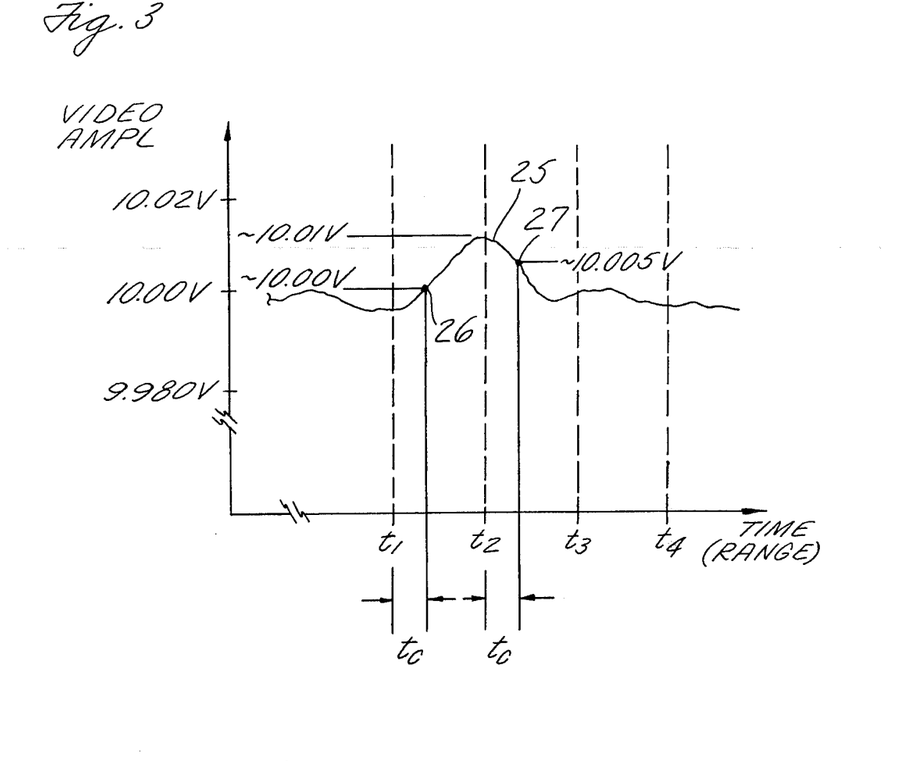
FIG. 3 is an illustration of a received signal used in conjunction with the operation of the embodiment of FIG. 1.

As described hereinbefore, the analog video signal includes both high frequency components from moving targets and a low frequency component from relatively stationary targets, or clutter. The clutter component signal, representative of the background terrain against which a moving target must be detected, comprises the majority of the analog video signal amplitude. In a non-coherent radar system, a moving target is detected by sensing the changing amplitude of the radar return signal in successive pulse repetition periods, resulting from the change in Doppler frequency as the target moves away from, or towards the transmitter. Since the typical moving target-to-clutter signal ratio is on the order of minus 20 to minus 60 db, the moving target signal amplitude may only represent one-thousandth of the clutter amplitude in any single pulse repetition period. One such return in a single pulse repetition period is shown in FIG. 3, wherein the amplitude of the return target component 25 is on the order of 10 millivolts, as compared to an average clutter amplitude on the order of 10 volts. The time intervals $t_1$ through $t_4$ represent a portion of a plurality of time intervals provided by a quantization of the non-pulse portion of the pulse repetition period by the line 12 timing signal, and represent the time intervals during which the analog video signal is sampled and converted into successive digital signals by a system A/D converter, as described in detail hereinafter. In a range-gated MTI, the time intervals are representative also of the system range bins. Typically the moving target amplitude appears in more than one of the time intervals, and the A/D converter (with a conversion time of $t_c$) samples the amplitude only once during each of the successive intervals, as indicated by the sample points 26, 27. The sample at 26 provides a 10 volt amplitude and the sample at 27 provides a 10.005 volt amplitude, resulting in a differential sampled amplitude of 5 millivolts representing the return target signal. Therefore, the A/D converter must be capable of detecting 5 millivolts out of approximately 10 volts resulting in a required minimum resolution accuracy of 0.05 percent. The quantization error, which is a measure of an A/D converter resolution accuracy, is defined as being equal to ± ½ LSB. If the maximum amplitude range of the analog video signal is twelve volts and the LSB is equal to 5 millivolts, the A/D converter requires a scaling, or word decimal value (full scale value) of 12v ÷ 0.005v = 2400, which represents a binary word length in excess of 11 bits. Consideration of other circuit tolerances would therefore lead to the selection of a twelve bit, or 4095 word decimal value, where the LSB = 2.93 millivolts, and the quantization error is approximately ± 1.5 millivolts. Since ±60 db represents a minimum typical value of moving target-to-clutter signal ratio, as may be appreciated, smaller signal ratios result in relatively smaller target amplitudes and higher resolution accuracy requirements for the system A/D converter. A/D converter bit capacities of 13 and 14 bits are not uncommmon in present digital MTI systems, resulting in a disproportionate cost factor being allocated for the A/D converter as compared to the remaining digital circuitry.

Referring again to FIG. 1, in a typical prior art digital MTI system, the analog signals on the line 24 are presented directly to a system (A/D) converter, such as the A/D converter 28, which provides a plurality of digital video signals, each equivalent to the amplitude of the analog video signal in a different one of the plurality of time intervals of the PRP, and presents these digital signals through a set of lines 29 to a filter and detection network 30. The digital video signal for each time interval is clocked into the MTI filter network 30 on successive line 12 clock cycles. The MTI filter and detection network 30 is a digital network which may comprise either a plurality of range gated filter networks (the number of range gated networks required being dependent upon the range coverage, and the main bang pulse width), or of a delay line canceller type network, both of which are well known in the art, and which filter the composite clutter plus moving target return signal to remove the clutter component, and detect the moving target component. The output of the filter and detector network is provided through a set of lines 32 to a display processor 34, which provides an indication of the moving target on any suitable type display as may be required in an individual MTI system.

In accordance with the present invention, the requirement for a large bit capacity, or high resolution accuracy for the A/D converter 28 is eliminated by reducing the clutter component amplitude of the analog video signal in a prefilter network 36, thereby enhancing the moving target-to-clutter signal ratio prior to conversion in the A/D converter 28.

The prefilter 36 includes an A/D converter 38 which receives the return radar analog video signals on the line 24 from each PRP, and provides a plurality of low resolution equivalent, digital video signals on a set of lines 40, for each PRP time interval. The resolution accuracy of the A/D converter 38 is less than that required to provide amplitude discrimination between the moving target signal component and the clutter signal component, and therefore, provides a digital video signal with a word decimal value substantially smaller than that required for converting the entire analog video signal at a resolution sufficient for detecting a moving target in the predominantly clutter return. The digital video signals on the lines 40 are presented to a low-pass filter 42, which passes only the lower frequency clutter signal components (the filter cut-off frequency being selected to be greater than the maximum frequency of the clutter signal component and less than the minimum moving target frequency) as described in detail hereinafter. The filter 42 presents the digital clutter signal component through a set of lines 44 to a digital-to-analog (D/A) converter 46. The D/A converter 46 reconverts the digital representation of the substantially pure clutter signal component on the lines 44 into an analog signal, which is provided at the output of the converter on the line 48. The resolution accuracy of the D/A converter is relatively high so that it may provide an analog signal which is substantially equal in magnitude to that portion of the clutter signal provided by the low resolution A/D converter 38. However, as may be known, the cost of providing a high resolution D/A converter is far less than that of an equal resolution A/D converter. The analog clutter signal component on the line 48 is presented to a summing junction 50, which receives at a second input, the return radar analog video signal on the lines 24. The clutter signal component is subtracted from the composite clutter plus moving target components of the line 24 video signal in the summing junction 50, and an analog sum signal representative of the difference amplitude between the two signals is presented through a line 52 to the A/D converter 28. The analog sum signal on the line 52 has a substantially reduced clutter component and a greatly enhanced moving target-to-clutter signal ratio, permitting a reduction in the bit capacity and consequently the resolution accuracy of the A/D converter 28 by as much as a factor of one-half.

Figure 2:
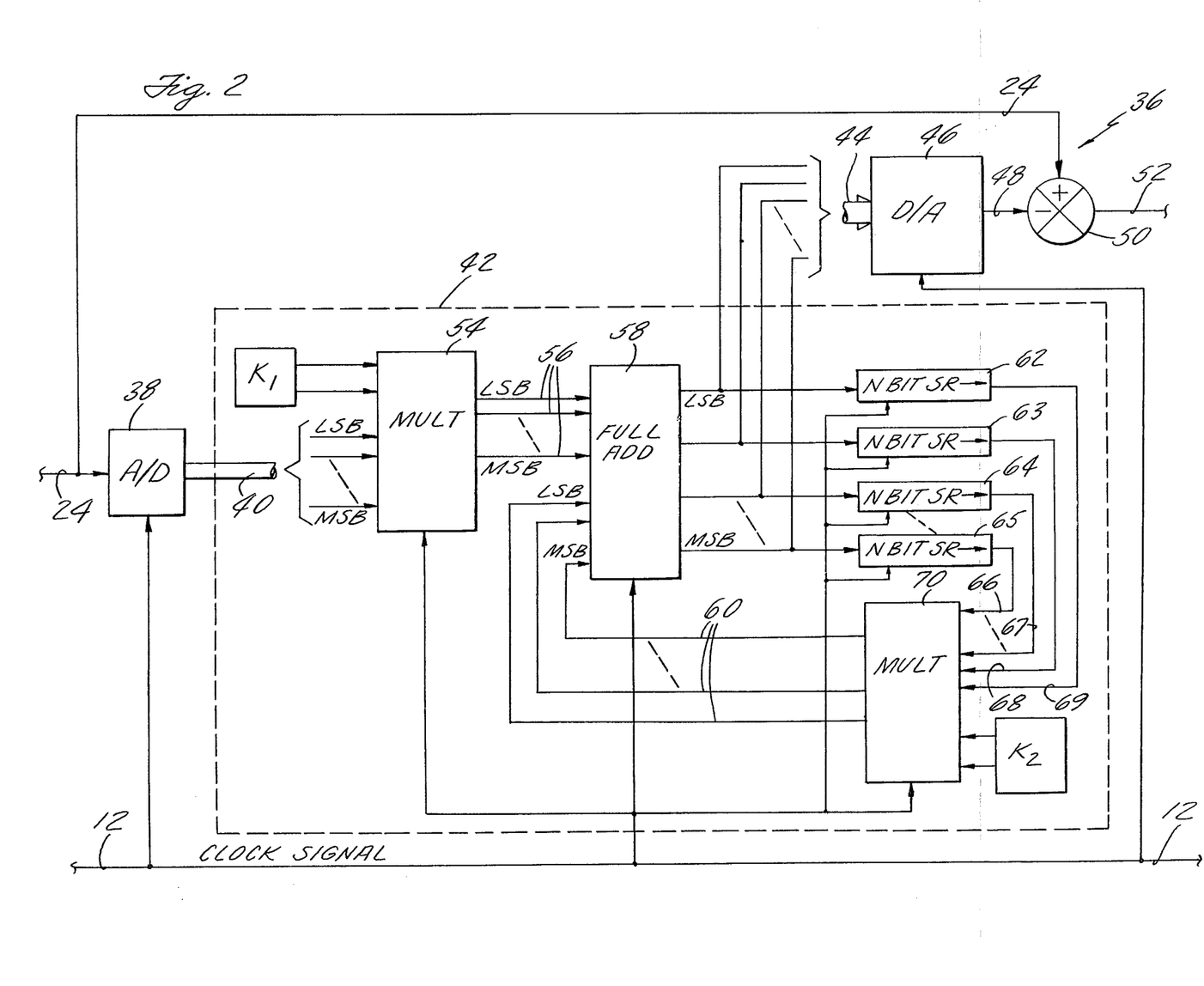
FIG. 2 is a schematic diagram of a prefilter circuit used in the embodiment of FIG. 1.

Referring now to FIG. 2, the analog video signal on the line 24 is presented to the A/D converter 38 which provides a plurality of digital video signals in response thereto on the lines 40. As stated hereinbefore, the resolution of the A/D converter 38 is substantially less than that required for amplitude discrimination or detection of the moving target signal from the clutter signal. The lines 40, corresponding in number to the number of output bit lines of the A/D converter 36, are presented to the low pass filter 42 (FIG. 1) at one input of a multiplier 54, comprising a number of individual multipliers of a type well known in the art such as the Fairchild 9344. The multiplier 54 receives a digital signal $K_1$ at a second input, which represents a scaling constant with a value less than unity, and provides an input digital signal, representative of the product of the digital video signal and the constant $K_1$, through a set of lines 56 to one input of a full adder 58, such as the Fairchild 9383. As may be appreciated, the scaled input digital signals may be provided through any combination of processing which provides an equivalent product value. The full adder combines the plurality of input digital signals on the lines 56 with a plurality of feedback digital signals appearing on a set of lines 60 at a second input to the adder. As described hereinafter, the feedback digital signals represent the product of each of the plurality of input digital signals from the immediately preceding pulse repetition period, and a feedback scaling constant value less than unity. The output of the full adder 58, a plurality of digital sum signals, is presented through the lines 44, comprising a plurality of digital bit lines, to the D/A converter 46, and shift registers 62 through 65. The shift registers, one for each digital bit line within the lines 44, are of the serial in, serial out type, such as the Texas Instrument SN7491A, and include a number of such shift registers in series to provide a plurality of bits corresponding to the number of time intervals provided within the non-pulse portion of the PRP. The registers 62–65 are also presented with the clock signal on the line 12 which controls the serial shifting of the individual sum signal bits through the registers. The plurality of sum digital signals from the shift registers 62–65 are provided through lines 66 through 69 respectively, to a second multiplier 70, similar to the multiplier 54. The second multiplier 70 receives at a second input a digital signal $K_2$, which represents a feedback scaling constant whose value is less than unity, and provides a plurality of digital feedback signals, representative of the product of the sum signals and the constant $K_2$, to the second input of the full adder 58. The sum of the constants $K_1$ and $K_2$ is equal to unity, and the clock signal on the line 12 is presented to the A/D converter 38, the multiplier 54, the full adder 58, the shift registers 62–65, the multiplier 70, and the D/A converter 46, to provide synchronization of the prefilter 36 with the transmitter 10 and filter and detection network 30.

In operation, the clock signal on the line 12 controls the sample increment of the A/D converter 38 in each PRP time interval, which provides the digital video signal equivalent of the analog video signal amplitude appearing in each time interval, on the lines 40. The lines 40 including a plurality of lines equal to the bit capacity of the converter 38, and extending from the least significant bit (LSB) to the most significant bit (MSB). The number of bits is equal to the selected resolution of the A/D converter as described hereinbefore. The multiplier 54 provides the product (input digital signal) of each digital video signal and $K_1$ through the lines 56 to the full adder 58. The full adder 58 adds each of the input signals on the lines 56 with that one of the plurality of feedback signals on the lines 60 which appears in the same time interval, and provides the sum digital signal on the digital bit lines 44. A new set of digital sum signals is provided on the plurality of digital bit lines for each PRP time interval. The individual bits of the sum signal on each of the individual bit lines are clocked through a respective one of the shift registers 62–65 on successive line 12 clock cycles, such that the end of one PRP each of the shift registers has stored a plurality of serial bits, each representing one bit in the corresponding plurality of digital sum signals provided in that PRP, the combination of the registers 62–65 providing serial storage of the sum signals provided in the PRP. With the beginning of the next PRP, the sum signal data stored in the shift registers 62–65 is clocked out, one digital signal at a time beginning with the sum signal provided from the first interval of the preceding PRP, as the digital signals corresponding to the time intervals of the second PRP are received at the multiplier 54. The shift registers function as a first in/first out memory storage for successive PRP cycles, such that as the first time interval sum signal of a second PRP appears on the lines 40, the first time interval sum signal of the immediately preceding PRP is clocked onto the lines 66–69, and is multiplied in the multiplier 70 by the scaling constant $K_2$. This scaled signal, or feedback signal, is presented through the lines 60 to the full adder 58, and added to the first time interval input signal provided by the multiplier 54 from the second PRP. The sum of these two first time interval signals of the two successive sweeps is presented on the lines 44 to the D/A converter 46, and the shift registers 62–65, which clock this sum signal, one clock interval at a time, through the registers to repeat the cycle for successive pulse repetition periods. The successive plurality of sum signals appearing on the lines 44 from each PRP, represent only the lower frequency clutter component of the digital video signals provided by the A/D converter 38. This may be shown by allowing S to represent the total number of digital video signals appearing on the lines 40 in any one pulse repetition period. Then, the total digital sum signal ($S_T$) appearing on the lines 44 on successive pulse repetition periods is described as follows:

| PRP | SUM SIGNAL |
|---|---|
| 1st | $S_T = S_1 K_1 K_2$ |
| 2nd | $S_T = S_2 K_1 K_2 + S_1 K_1 K_2^2$ |
| 3rd | $S_T = S_3 K_1 K_2 + S_2 K_1 K_2^2 + S_1 K_1 K_2^3$ |
| . | |
| . | |
| Nth | $S_T = S_N K_1 K_2 + S_{N-1} K_1 K_2^2 + \ldots S_1 K_1 K_2^N$ |

Since $K_1 + K_2 = 1$, the product $K_1 K_2$ is always less than unity, and as may be seen, the contribution of the digital video signals from the earlier PRP's to the total digital sum signal appearing on the lines 44, is diminished as a result of successive cycles through the registers 62–65 and multiplier 70. Since the moving target signal amplitude varies with each PRP, any moving target signal component which is converted through the low resolution A/D converter 38, is quickly attenuated on successive cycles through the multiplication by the constants $K_1$, $K_2$ and the addition on each cycle to successive PRP returns in which the target signal amplitude has changed. As a result, only the relatively fixed amplitude of the clutter signal component is represented in the digital sum signals, and the process represents an implementation of a first order, or single pole digital low-pass filter. The implementation of such a filter is derived through the use of Z transforms based upon the impulse inputs of the digital signal provided by the A/D converter 38. The use of Z transforms and the derivation of the "pulse transfer function" used to implement a digital filter equivalent of an analog filter is described in a book entitled *Sample Data Control Systems*, by Ragazzini and Franklin; McGraw Hill Book Company, Inc., 1958, pp. 64–79.

For a given pulse repetition frequency, the proper selection of the $K_1$, $K_2$ constant values (the sum of which is always unity) defines the bandwidth of the low-pass filter, the values being selected to provide an upper corner frequency which is above that of the highest frequency in the clutter frequency spectrum, which is subsequently dependent upon the type of digital MTI and its operating environment. Typical decimal values for the constants may be $K_1 = 0.02$, and $K_2 = 0.98$.

The D/A converter 46 simultaneously converts the digital sum signals for each successive PRP into an analog signal equivalent of the clutter component for summation with the analog video signal on the line 24 in the summing junction 50. The summing junction 50 subtracts the analog clutter signal on the line 48 from the total clutter plus moving target video signal on the line 24, to provide a clutter plus moving target signal with a substantially greater target-to-clutter signal ratio than that of the analog video signal on the line 24, thereby reducing the dynamic range, or resolution accuracy requirement of the A/D converter 28 while maintaining system target detection accuracy and reducing overall cost.

The digital MTI radar system of the present invention permits the use of two A/D converters having lower dynamic range, and resolution accuracy requirements and subsequent lower cost, together with a high resolution (low cost) D/A converter, in place of the high resolution, larger dynamic range A/D converter of the prior art digital MTI systems, therefore, providing for a reduction in signal processing costs. The present invention further provides for the possibility of improved system accuracy in detecting moving targets by using two A/D converters which individually have a lower resolution accuracy than the prior art system signal A/D converter, but which in combination provide an overall accuracy which surpasses the prior art system, with little or no increase in cost. The prefilter network of the present invention is severally adaptable to any existing digital MTI system, thereby permitting the retrofit and subsequent cost reduction for existing systems. Similarly, although the invention has been shown and described with respect to an illustrative embodiment thereof, it should be understood by those skilled in the art that the foregoing and various other changes, omissions and additions in the form and detail thereof may be made therein without departing from the spirit and the scope of the invention.

Having thus described a typical embodiment of our invention, that which we claim as new and desire to secure by Letters Patent is:

1. A digital moving target indicator radar system, comprising:

oscillator means for providing a timing signal;

signal means for providing pulsed radar energy for illuminating a spatial sector at a pulse repetition period in dependence on the timing signal and for receiving, during a non-pulse portion of the pulse repetition period, reflected radar energy from targets within the sector, said signal means providing in response thereto an analog video signal having a given amplitude, high frequency target signal component representative of moving targets and a larger amplitude, low frequency clutter signal component representative of relatively stationary targets, the analog video signal being characterized by a given value target-to-clutter signal ratio;

prefilter means, responsive to the analog video signal and the timing signal, for reducing the amplitude of the low frequency clutter component to provide a low clutter analog video signal with a target-to-clutter signal ratio which is substantially greater than that of said signal means video signal;

first analog-to-digital conversion means, responsive to the low clutter analog video signal and the timing signal for providing a plurality of low clutter digital video signals representative of the analog video signal amplitude coincident in a plurality of successive time intervals provided by the quantization of the pulse repetition period in dependence on the timing signal, said analog-to-digital conversion means having a resolution accuracy capable of providing amplitude discrimination between the target signal component and the reduced clutter signal component, the resolution accuracy being substantially less than that required to provide equal accuracy amplitude discrimination of the target signal component of said signal means video signal; and filter and detection means, responsive to said analog-to-digital conversion means, for filtering the low clutter digital signal to provide detection of the high frequency target signal component, and for providing in response thereto a signal manifestation representative of a moving target.

2. The system according to claim 1, wherein said prefilter means comprises:

second analog-to-digital conversion means, responsive to the analog video signal and the timing signal, for providing a plurality of successive digital video signals representative of the analog video signal amplitude coincident in each of a plurality of successive, equal time intervals comprising the non-pulse portion of the pulse repetition period, the time intervals being provided by a quantization of the non-pulse portion in dependence on the timing signal, said second conversion means having a resolution accuracy which is less than that required to provide accurate amplitude discrimination between the target signal and clutter signal components of the analog video signal;

digital low-pass frequency filter means, responsive to the digital video signals, for attenuating the high frequency target signal component of the digital video signals to provide a plurality of filtered digital signals representative of the low frequency clutter component amplitude of the analog video signal;

digital-to-analog conversion means, responsive to the plurality of filtered digital signals for providing an analog signal equivalent thereof, the analog signal being representative of a substantial portion of the clutter component amplitude of the signal means analog video signal; and summing means, responsive to the analog signal from said digital-to-analog conversion means and to the analog video signal from said signal means, for providing a sum analog signal representative of the difference amplitude therebetween, and for presenting the sum signal to said first analog-to-digital conversion means.

3. The system according to claim 2, wherein said digital low-pass frequency filter means comprises:

first multiplier means, responsive to the digital video signals for providing a plurality of filter input digital signals in response thereto, each of the input digital signals being representative of the product of one of the plurality of digital signals and a scaling constant value less than unity;

full adder means, responsive at one input to the plurality of input digital signals, and responsive at another input to a plurality of feedback digital signals, one for each time interval, for adding the input signal in each of the time intervals to a corresponding time interval feedback signal to provide a plurality of digital sum signals, each sum signal including a plurality of digital bits presented by said adder means on a plurality of digital bit lines to said digital-to-analog conversion means;

a plurality of serial shift register means, each connected for response to a different one of the digital bit lines, each register means providing, in response to successive time intervals, sequential shifting and storage of the plurality of successive digital bits on the respective bit line, each bit corresponding to one bit from each of the plurality of successive digital sum signals in each pulse repetition period, said plurality of shift register means, in combination, storing the plurality of sum signals in each pulse repetition period, and presenting the sum signals, one during each time interval, on a plurality of signal lines after a delay of one pulse repetition period; and second multiplier means, connected for response to said plurality of signal lines, for multiplying each of the delayed sum signals by a constant value less than unity, and for providing in response thereto, a plurality of feedback signals to said full adder means.

4. An improved digital moving target indicator radar system of the type having an antenna, an oscillator for providing a timing signal, a transmitter for providing to the antenna pulsed radar energy to the antenna having a pulse repetition period in dependence on the timing signal for illuminating successive portions of a spatial sector, a receiver for receiving, during a non-pulse portion of the pulse repetition period, reflected radar energy from targets within the sector and for providing in response thereto an analog video signal having a small amplitude, high frequency target signal component from moving targets, and a high amplitude, low frequency clutter signal component from relatively stationary targets, the video signal being characterized by a small value target-to-clutter signal ratio, an analog-to-digital converter for providing a digital signal equivalent of the analog video signal at a resolution accuracy capable of providing amplitude discrimination between the target signal component and the clutter signal component, and filter and detection circuitry for providing a signal manifestation for moving targets detected within the spatial sector, wherein the improvement comprises:

first analog-to-digital conversion means, responsive to the analog video signal and the timing signal, for providing a plurality of successive digital video signals representative of the analog video signal amplitude coincident in each of a plurality of successive, equal time intervals comprising the non-pulse portion of the pulse repetition period, the time intervals being provided by a quantization of the non-pulse portion in dependence on the timing signal, said conversion means having a resolution accuracy which is less than that required to provide accurate amplitude discrimination between the target signal and clutter signal components of the analog video signal;

digital low-pass frequency filter means, responsive to the digital video signals, for attenuating the high frequency target signal component of the digital video signals to provide a plurality of filtered digital signals representative of the low frequency clutter component amplitude of the analog video signal;

digital-to-analog conversion means, responsive to the plurality of filtered digital signals for providing an analog signal equivalent thereof, the analog signal being representative of a substantial portion of the clutter component amplitude of said signal means analog video signal;

summing means, responsive to the analog signal from said digital-to-analog conversion means and to the analog video signal from said signal means, for providing a sum analog signal representative of the difference amplitude therebetween, and representative of a low clutter analog video signal with a target-to-clutter signal ratio which is substantially greater than that of the video signal from the receiver; and second analog-to-digital conversion means, responsive to the low clutter analog video signal, for providing a plurality of low clutter digital video signals, each representative of the analog video signal amplitude coincident in a different one of the plurality of time intervals of the pulse repetition period, said second conversion means having a resolution accuracy capable of providing amplitude discrimination between the target signal and clutter signal components of the low clutter video signal, the resolution accuracy being substantially less than that required to provide equal accuracy amplitude discrimination of the target signal component of the receiver video signal, said second conversion means presenting the low clutter digital video signals to said filter and detection circuitry.

5. The improved system according to claim 4, wherein said digital low-pass frequency filter means comprises:

first multiplier means, responsive to the digital video signals for providing a plurality of filter input digital signals in response thereto, each of the input digital signals being representative of the product of one of the plurality of digital signals and a scaling constant value less than unity;

full adder means, plurality at one input to the plurality of input digital signals, and responsive at another input to a plurality of feedback digital signals, one for each time interval, for adding the input signal in each of the time intervals to a corresponding time interval feedback signal to provide a plurality of digital sum signals, each sum signal including a plurality of digital bits presented by said adder means on a plurality of digital bit lines to said digital-to-analog conversion means;

a plurality of serial shift register means, each connected for response to a different one of the digital bit lines, each register means providing, in response to successive time intervals, sequential shifting and storage of the plurality of successive digital bits on the respective bit line, each bit corresponding to one bit from each of the plurality of successive digital sum signals in each pulse repetition period, said plurality of shift register means, in combination, storing the plurality of sum signals in each pulse repetition period, and presenting the sum signals, one during each time interval, on a plurality of signal lines after a delay of one pulse repetition period; and second multiplier means, connected for response to said plurality of signal lines, for multiplying each of the delayed sum signals by a constant value less than unity, and for providing in response thereto, a plurality of feedback signals to said full adder means.

6. A method for detecting a moving target comprising the steps of:

transmitting to an antenna a pulsed radar energy at a pulse repetition period for illuminating successive portions of a spatial sector, and controlling the pulse repetition period with a timing signal;

receiving reflected radar energy, during a non-pulse portion of the pulse repetition period, from targets within the sector, and providing therefrom an analog video signal having a high frequency target signal component from moving targets, and a low frequency clutter signal component from relatively stationary targets;

quantizing the non-pulse portion of each pulse repetition period into a plurality of equal time intervals in dependence upon the timing signal;

providing a plurality of digital video signals for each pulse repetition period, each digital video signal being representative of the analog video signal amplitude coincident in each of the plurality of equal time intervals, at a resolution accuracy less than that required for amplitude discrimination of the high frequency target signal component from the low frequency clutter signal component;

filtering the plurality of digital video signals to remove the high frequency signal component, and to provide a filtered digital video signal representative of the low frequency clutter signal component of the digital video signal;

providing an analog signal equivalent of the plurality of filtered digital video signals in each pulse repetition period, the analog signal being substantially representative of the clutter component of the analog video signal;

summing the analog signal equivalent of the filtered digital video signal with the analog video signal, to provide an analog sum signal representative of the difference amplitude therebetween, and representative of a low clutter analog video signal with a target-to-clutter signal ratio which is substantially greater than that of the received analog video signal;

converting the low clutter, analog video signal amplitude coincident in each of the plurality of equal time intervals into a low clutter digital signal equivalent at a resolution accuracy capable of providing amplitude discrimination between the high frequency target signal and low frequency clutter components of the low clutter analog video signal;

filtering the low clutter digital signal to extract only the high frequency signal component; and detecting the amplitude of the extracted high frequency signal components.

7. The method of claim 6, wherein the filtering of the digital video signals comprises the steps of:

providing a plurality of input digital signals in response to the plurality of digital video signals in each pulse repetition period, each of the plurality of input signals representing the product of a corresponding time interval digital video signal and an input scaling constant value less than unity; and combining each of the plurality of input digital signals from each pulse repetition period with one of a plurality of feedback digital signals coincident in the same time interval, to provide a plurality of sum digital signals for each pulse repetition period, each of the plurality of feedback signals being representative of the product of an input digital signal from a corresponding time interval in the immediately preceding pulse repetition period and a feedback scaling constant having a value equal to the difference between the input scaling constant value and unity, the plurality of sum digital signals representing the low clutter component of the digital video signal.

8. An improved method for detecting a moving target of the type including the steps of transmitting pulsed radar energy at a pulse repetition period controlled by a timing signal, receiving reflected radar energy and providing a composite analog video signal which includes a small amplitude, high frequency target signal component for moving targets, and a large amplitude, low frequency clutter signal component from relatively stationary targets, converting the analog video signal to provide a digital video signal having a high resolution accuracy sufficient to insure amplitude discrimination of a high frequency target signal component from the low frequency clutter signal component, filtering the high resolution digital video signal to extract only the high frequency signal component, and detecting the amplitude of the extracted high frequency digital signal component to provide a signal manifestation of a moving target for high frequency signal component amplitudes in excess of a predetermined threshold, the improvement comprising the steps of:

quantizing the non-pulse portion of each pulse repetition period into a plurality of equal time intervals in dependence upon the timing signal;

providing a plurality of digital video signals for each pulse repetition period, each digital video signal being representative of the analog video signal amplitude coincident in each of the plurality of equal time intervals, at a resolution accuracy less than that required for amplitude discrimination of the high frequency target signal component from the low frequency clutter signal component;

filtering the plurality of digital video signals to remove the high frequency signal component, and to provide filtered digital video signal representative of the low frequency clutter signal component of the digital video signal;

providing an analog signal equivalent of the plurality of filtered digital video signals in each pulse repetition period, the analog signal being substantially representative of the clutter component of the analog video signal;

summing the analog signal equivalent of the filtered digital video signal with the analog video signal, to provide an analog sum signal representative of the difference amplitude therebetween, and representative of a low clutter analog video signal with a target-to-clutter signal ratio which is substantially greater than that of the received analog video signal; and converting the low clutter, analog video signal amplitude coincident in each of the plurality of equal time intervals into a low clutter digital signal equivalent at a resolution accuracy capable of providing amplitude discrimination between the high frequency target signal and low frequency clutter components of the low clutter analog video signal.

9. The improved method of claim 8, wherein the filtering of the digital video signals comprises the steps of:

providing a plurality of input digital signals in response to the plurality of digital video signals in each pulse repetition period, each of the plurality of input signals representing the product of a corresponding time interval digital video signal and an input scaling constant value less than unity; and combining each of the plurality of input digital signals from each pulse repetition period with one of a plurality of feedback digital signals coincident in the same time interval, to provide a plurality of sum digital signals for each pulse repetition period, each of the plurality of feedback signals being representative of the product of an input digital signal from a corresponding time interval in the immediately preceding pulse repetition period and a feedback scaling constant having a value equal to the difference between the input scaling constant value and unity, the plurality of sum digital signals representing the low clutter component of the digital video signal.

* * * * *

UNITED STATES PATENT OFFICE
CERTIFICATE OF CORRECTION

PATENT NO. : 4,003,052
DATED : January 11, 1977
INVENTOR(S) : Stephen Adelman, Marshall Greenspan It is certified that error appears in the above-identified patent and that said Letters Patent are hereby corrected as shown below:

Column 1, line 64, "vide" should read --video--

Column 5, line 9, "$\pm 60$" should read -- -60 --

Column 5, line 32, "nunber" should read --number--

Column 7, line 40, after "that", insert --at--

Column 12, Claim 5, line 24, after "means," cancel

"plurality" and insert --responsive--

Column 12, Claim 5, line 30, "laity" should read --ality--

Signed and Sealed this

Sixth Day of September 1977

[SEAL]

Attest:

RUTH C. MASON
Attesting Officer

LUTRELLE F. PARKER
Acting Commissioner of Patents and Trademarks